United States Patent
Koskinen et al.

(10) Patent No.: US 10,334,660 B2
(45) Date of Patent: Jun. 25, 2019

(54) SIGNALLING ABOUT ON-GOING AND STARTING BROADCAST-SERVICE SESSIONS ON OTHER FREQUENCY CARRIERS

(75) Inventors: Henri M. Koskinen, Espoo (FI); Igor Filipovich, Chicago, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 562 days.

(21) Appl. No.: 13/136,781

(22) Filed: Aug. 10, 2011

(65) Prior Publication Data

US 2013/0039248 A1    Feb. 14, 2013

(51) Int. Cl.
*H04W 76/40*    (2018.01)
*H04W 72/00*    (2009.01)
(Continued)

(52) U.S. Cl.
CPC .......... *H04W 76/40* (2018.02); *H04L 12/189* (2013.01); *H04W 72/005* (2013.01); *H04W 36/36* (2013.01)

(58) Field of Classification Search
CPC ....... H04L 12/16; H04L 12/18; H04L 12/185; H04L 12/189; H04W 36/0083;
(Continued)

(56) References Cited

U.S. PATENT DOCUMENTS

2004/0185837 A1* 9/2004 Kim ................. H04H 60/91
455/414.3
2006/0251019 A1* 11/2006 Dalsgaard ......... H04W 36/0055
370/331

(Continued)

FOREIGN PATENT DOCUMENTS

JP    2010/502054 A    1/2010
JP    2013/500643 A    1/2013
(Continued)

OTHER PUBLICATIONS

3GPP TS 36.331 V10.0.0 (Dec. 2010) 3rd Generation Partnership Project; Technical Specification Group Radio Access Network; Evolved Universal Terrestrial Radio Access (E-UTRA); Radio Resource Control (RRC); Protocol specification (Release 10) (276 pages).

(Continued)

*Primary Examiner* — Khoa Huynh
(74) *Attorney, Agent, or Firm* — Harrington & Smith (57) ABSTRACT

The exemplary embodiments of the invention provide at least a method, apparatus, and executable computer program to perform operations including signaling MBMS change related information to, from, or between network devices in the same or different carrier frequencies. The MBMS related information regarding new, on-going, appearing, and/or disappearing multi-cast services offered in different frequency cells. Further, the exemplary embodiments of the invention provide for determining that multi-cast services in different carrier frequencies are new, on-going, appearing, and/or disappearing multi-cast services. In addition, the exemplary embodiments of the invention provide for operations at network devices to send and receive signaling regarding changes to multi-cast services offered in the same and/or a different carrier frequency. Further, the exemplary embodiments of the invention provide for operations to announce only changes to a set of MBMS services offered in a carrier frequency to network devices in the same or other carrier frequencies. The exemplary embodiments provide operations for signaling between different network devices in the same and/or different carrier frequencies to indicate that a network device is to be informed regarding changes to the multi-cast services provided in a carrier frequency.

15 Claims, 4 Drawing Sheets

(51) Int. Cl.
*H04L 12/18* (2006.01)
*H04W 36/36* (2009.01)

(58) Field of Classification Search
CPC ..... H04W 36/08; H04W 36/18; H04W 36/30; H04W 36/32; H04W 36/36; H04W 72/005; H04W 76/002; H04W 76/40
See application file for complete search history.

(56) References Cited

U.S. PATENT DOCUMENTS

| | | | | |
|---|---|---|---|---|
| 2008/0089285 | A1* | 4/2008 | Pirskanen | H04L 1/1621 370/329 |
| 2008/0273503 | A1* | 11/2008 | Lee et al. | 370/336 |
| 2008/0287129 | A1* | 11/2008 | Somasundaram | H04W 36/0055 455/436 |
| 2010/0080159 | A1 | 4/2010 | Hu et al. | |
| 2010/0174809 | A1* | 7/2010 | Chun | H04W 48/08 709/221 |
| 2011/0039551 | A1* | 2/2011 | Tsuboi | H04W 48/20 455/424 |
| 2011/0077006 | A1* | 3/2011 | Hsu | H04W 36/08 455/436 |
| 2011/0103288 | A1 | 5/2011 | Lee et al. | |
| 2011/0222457 | A1* | 9/2011 | Lee | H04W 28/06 370/312 |
| 2011/0305184 | A1* | 12/2011 | Hsu | H04L 65/4076 370/312 |
| 2012/0127913 | A1 | 5/2012 | Lin et al. | |
| 2012/0236776 | A1* | 9/2012 | Zhang | H04W 48/12 370/312 |

FOREIGN PATENT DOCUMENTS

| | | |
|---|---|---|
| KR | 100622020 B1 | 9/2006 |
| WO | WO 2008/025239 A1 | 3/2008 |
| WO | WO 2011/011975 A1 | 2/2011 |

OTHER PUBLICATIONS

3GPP TS 36.331 V10.2.0 (Jun. 2011) 3rd Generation Partnership Project; Technical Specification Group Radio Access Network; Evolved Universal Terrestrial Radio Access (E-UTRA); Radio Resource Control (RRC); Protocol specification (Release 10) (294 pages).
3GPP TS 25.346 V10.0.0 (Mar. 2011) 3rd Generation Partnership Project; Technical Specification Group Radio Access Network; Introduction of the Multimedia Broadcast/Multicast Service (MBMS) in the Radio Access Network (RAN); Stage 2 (Release 10) (71 pages).
3GPP TSG-RAN WG2#59; R2-074412; *Mobility and Service continuity for UEs in MBMS Point-to-multipoint mode* (2 pages).
TSG-RAN Meeting #51; RP-110452; *WID: Service continuity and location information for MBMS for LTE* (6 pages).
Alcatel-Lucent Shanghai Bell et al: "Issues of MBMS service provision under CA"; 3GPP Draft; R2-112229; 3rd Generation Partnership Project (3GPP), Mobile Competence Centre; 6550, Route des Lucioles; F-06921 Sophia-Antipolis Cedex; France; vol. RAN WG2, No. Shanghai, China; Apr. 11, 2011, Apr. 4, 2011 (Apr. 4, 2011), XP050494394, 4 pgs.
ZTE et al: "Consideration on MBMS deployments in CA"; 3GPP Draft; R2-112898, Consideration on MBMS Deployments in CA; 3rd Generation Partnership Project (3GPP); Mobile Cometence Centre; 650, Route des Lucioles; F-06921 Sophia-Antipolis Cedex; France; vol. Ran WG2, No. Barcelona, Spain; May 9, 2011, May 3, 2011 (May 3, 2011), XP050495287, 2 pgs.
R2-112897; ZTE, Potevio; "MBMS Service discovery in Carrier aggregation deployment"; 3GPP TSG-RAN WG2 Meeting #74; May 9-13, 2011, Barcelona, Spain.
R2-113187, Huawei, HiSilicon, "(Re)Selecting appropriate frequency/cell fro service continuity", 3GP TSG-RAN WG2 Meeting #74, May 9-13, 2011.

* cited by examiner

SIGNALLING ABOUT ON-GOING AND STARTING BROADCAST-SERVICE SESSIONS ON OTHER FREQUENCY CARRIERS

TECHNICAL FIELD

The exemplary embodiments of this invention relate generally to networks that support multimedia broadcast service (MBMS).

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
BCCH broadcast control channel
LTE long term evolution
MBMS multimedia broadcast-multicast service
MBSFN MBMS single-frequency network
MCC mobile country code
MCCH MBMS control channel
MCN mobile network code
MNO mobile network operator
M-RNTI MBMS radio network temporary identifier
PDCCH physical downlink control channel
RNTI radio network temporary identifier
SIB system information block
TMGI temporary mobile group identity
UTRAN universal terrestrial radio access network In LTE Rel-10 standards, a Multimedia Broadcast-Multicast Service (MBMS) is only optimized for single-carrier deployments. In this type of deployment, for terminals in an RRC_Idle state, cell reselection rules make no exceptions for the purpose of MBMS reception. Further, terminals in an RRC_Connected state in this type of network have no means of informing the network of their possible interest in MBMS reception. Thus, in either of these states the terminals are not provided with means for uninterrupted reception of MBMS services available on a certain frequency.

To understand the problem addressed by this invention, one only needs to consider that a terminal in an RRC_Connected state, possibly capable of receiving information on only one frequency carrier at a time, is engaged in a unicast data transfer on one frequency carrier while MBMS service sessions are being or start to be broadcast on another carrier. It is submitted, that in order to try to inform such a terminal of MBMS services being or becoming available on different frequencies, a signalling mechanism is needed on top of what is specified in LTE Rel-10.

SUMMARY

In accordance with an exemplary aspect of the invention, there is a method comprising determining that there is a change to the set of multi-cast services that is provided in a cell on a carrier frequency, compiling a broadcast message comprising an indication of only the change to the set of multi-cast services, and sending the broadcast message in the cell on a different carrier frequency.

In accordance with an exemplary aspect of the invention, there is an apparatus comprising at least one processor, and at least one memory including computer program code, where the at least one memory and the computer program code are configured, with the at least one processor, to cause the apparatus to at least determine that there is a change to the set of multi-cast services that is provided in a cell on a carrier frequency, compile a broadcast message comprising an indication of only the change to the set of multi-cast services, and send the broadcast message in the cell on a different carrier frequency.

In accordance with an exemplary aspect of the invention, there is an apparatus comprising means for determining that there is a change to the set of multi-cast services that is provided in a cell on a carrier frequency, means for compiling a broadcast message comprising an indication of only the change to the set of multi-cast services, and means for sending the broadcast message in the cell on a different carrier frequency.

In accordance with another exemplary aspect of the invention, there is a method comprising receiving an indication that a terminal device served by a cell on a carrier frequency be informed of multicast services available in at least one other cell on at least one other carrier frequency, and in response to the indication, signaling to the terminal device identifiers of the multicast services available in the at least one other cell on at least one other carrier frequency.

In accordance with an exemplary aspect of the invention, there is an apparatus comprising at least one processor, and at least one memory including computer program code, where the at least one memory and the computer program code are configured, with the at least one processor, to cause the apparatus to at least receive an indication that a terminal device served by a cell on a carrier frequency be informed of multicast services available in at least one other cell on at least one other carrier frequency, and in response to the indication, signal to the terminal device identifiers of the multicast services available in the at least one other cell on at least one other carrier frequency.

In accordance with still another exemplary aspect of the invention, there is an apparatus comprising means for receiving, from a terminal device being served by a cell on a carrier frequency, an indication that the terminal device be informed of multicast services available in at least one other cell on at least one other carrier frequency, and means, in response to the indication, for signalling to the terminal device identifiers of the multicast services available in the at least one other cell on at least one other carrier frequency.

In accordance with an exemplary aspect of the invention, there is a method comprising receiving, from a cell on a carrier frequency, an indication that at least one multicast service is available in at least one other cell on at least one other carrier frequency, and in response to the indication, sending an indication that a terminal device be informed of the at least one multicast service available in the at least one other cell on the at least one other carrier frequency.

In accordance with an exemplary aspect of the invention, there is an apparatus comprising at least one processor, and at least one memory including computer program code, where the at least one memory and the computer program code are configured, with the at least one processor, to cause the apparatus to at least receive, from a cell on a carrier frequency, an indication that at least one multicast service is available in at least one other cell on at least one other carrier frequency, and send, in response to the indication, an indication that a terminal device be informed of the at least one multicast service available in the at least one other cell on the at least one other carrier frequency.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Considering at least the problems described above, it would therefore be desirable to at least provide techniques to signal a terminal, such as a mobile device, of on-going multimedia broadcast-multicast services (MBMS) available on another frequency carrier , such as while the terminal is in an RRC_Connected state.

In general MBMS control information is provided on a logical channel specific for MBMS common control information (MCCH). In case the network configures multiple MBSFN areas, the UE acquires the MBMS control information from the MCCHs that are configured to identify if services, which it is interested to receive, are ongoing. An MBMS capable UE is only required to support reception of a single MBMS service at a time, and a reception of more than one MBMS service and/or more than one MBSFN area is left for UE implementation. The MCCH carries an MBSFNAreaConfiguration message, which indicates the MBMS sessions that are ongoing as well as corresponding radio resource configuration.

MBMS control information can be provided on a BCCH. This includes information needed to acquire the MCCH(s). This information is carried by means of a single MBMS specific SystemInformationBlock: SystemInformationBlockType13.

Change of MCCH information only occurs at specific radio frames, i.e. the concept of a modification period is used. Within a modification period, the same MCCH information may be transmitted a number of times, as defined by its scheduling (which is based on a repetition period). The modification period boundaries are defined by SFN values for which SFN mod m=0, where m is the number of radio frames comprising the modification period. The modification period is configured by means of SystemInformationBlockType13.

Figure 4:
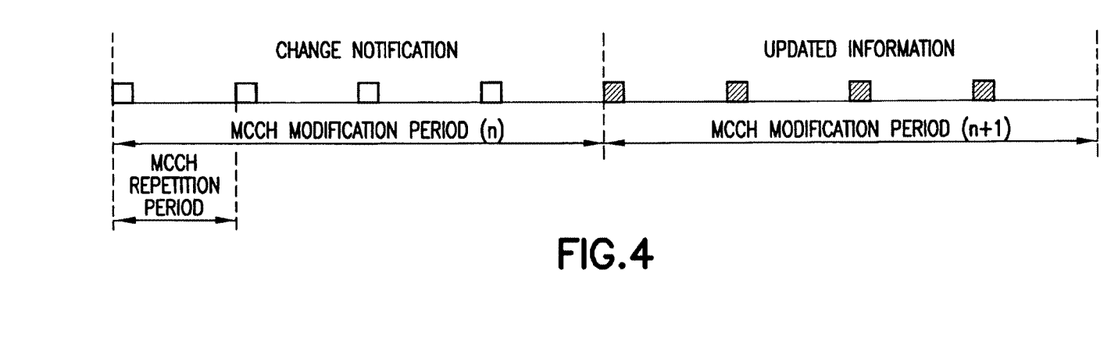
FIG. 4 reproduces FIG. 5.8.1.3-1 of 3GPP TS 36.331 V10.2.0.

If the network changes the MCCH information, it notifies the UEs about the change during a first modification period. In a next modification period, the network transmits the updated MCCH information. These general principles are illustrated in FIG. 4, in which different colours indicate different MCCH information. Upon receiving a change notification, a UE interested to receive MBMS services acquires the new MCCH information immediately from the start of the next modification period. The UE applies the previously acquired MCCH information until the UE acquires the new MCCH information.

Indication of an MBMS specific RNTI, the M-RNTI, on PDCCH is used to inform UEs in RRC_IDLE and UEs in RRC_CONNECTED about an MCCH information change. When receiving an MCCH information change notification, the UE is aware that the MCCH information will change at the next modification period boundary. The notification on PDCCH indicates which of the MCCHs will change, which is done by means of an 8-bit bitmap. In this bitmap, a bit at the position indicated by the field notificationIndicator is used to indicate changes for that MBSFN area: if the bit is set to "1", the corresponding MCCH will change.

The exemplary embodiments of the invention address issues related to informing mobile devices of MBMS sessions/services on-going or becoming available on different frequencies, such as while the mobile device is in an RRC_Connected state.

It is noted that one approach that may serve terminals in either an RRC_Idle state or an RRC_Connected state would be to list, in a System-Information Block (SIB), Temporary Mobile Group Identities (TMGIs) of such services, the TMGI being a globally unique identity for an MBMS service. Then the SIB listing TMGIs may be broadcast by the cell where such a terminals are presently camping or are receiving unicast data. However, this could be disadvantageous considering the potentially large size of a TMGI.

Each TMGI requires at least 27 bits to signal. A cell which supports MBMS can provide up to dozens or even hundreds of concurrent low-bit rate MBMS sessions, while the size of a SIB is limited to only 2000 bits. For the MBMS cell this size restriction may be alleviated since TMGIs can be broadcast on the MBMS Control Channel (MCCH), which because it is broadcast in a Single-Frequency Network (MBSFN) transmission it is significantly more radio-efficient.

Because of the large size of TGMIs, the SIB could rather only indicate the frequency carrier where MBMS services are available, and to find out exactly what services are available, the terminals being in an RRC_Idle state could simply be required to receive the MCCH of the MBMS cell. What remains is at least the problem stated above, regarding how to keep terminals in RRC_Connected state informed of MBMS services.

In Rel-10 LTE MBMS, on-going MBMS service sessions and their TMGIs are signalled on the MCCH of each MBSFN Area that the cell participates in. The start of a new service session appears simply as a newly appearing service session on the MCCH. Changes in the contents of MCCHs in an MBMS cell, due to such newly starting sessions, are notified to terminals using a dedicated-purpose PDCCH message scrambled with a dedicated RNTI referred to as M-RNTI. This message is broadcast at preconfigured occasions that are signalled along with the MCCH configurations in the MBMS-specific SIB13. The payload of this PDCCH-message format is defined as an 8-bit bitmap, where each bit set to '1' indicates a change on one of the maximum of 8 MCCHs broadcast in the cell (the mapping of the bits to MCCHs also being signalled in SIB13).

UTRAN MBMS features frequency-layer convergence as defined in 3GPP TS 25.346 (2011-03), 3rd Generation Partnership Project; Technical Specification Group Radio Access Network; Introduction of the Multimedia Broadcast/ Multicast Service (MBMS) in the Radio Access Network (RAN); Stage 2 (Release 10), section 11.2 as follows: "Frequency Layer Convergence (FLC), denotes the process where the UTRAN requests UEs to preferentially re-select to the frequency layer on which the MBMS service is intended to be transmitted." However, this frequency layer convergence is seen to be related to cell reselection and this does not suggest an equivalent selection while a device is in an RRC_Connected state, such as during an inter-frequency handover.

In addition, according to the current LTE specifications, modifications to System Information are notified to terminals as described in 3GPP TS 36.331 (2011-06) 3rd Generation Partnership Project; Technical Specification Group Radio Access Network; Evolved Universal Terrestrial Radio Access (E-UTRA); Radio Resource Control (RRC); Protocol specification (Release 10), section 5.2.1.3. In short, all terminals are notified about (almost) any change to System Information, which triggers all of the terminals to re-acquire those parts of System Information that are relevant to them.

It is noted that a Rel-11 MBMS work item RP-110452 is set to fill gaps existing in Rel-10 MBMS. One working assumption thus far is that any mechanisms specified will assume that where MBMS is provided, it is provided on one frequency carrier only.

However, there still exists at least the problems, as described above, related to informing a mobile terminal in an RRC_Connected state of MBMS services available on different frequency carriers, such as for allowing the terminal to inform the network that an inter-frequency handover to another carrier would be beneficial.

To address at least these problems, the exemplary embodiments of the invention, provide novel techniques to signal temporary mobile group identities (TMGIs) of on-going multimedia broadcast-multicast services (MBMS) by dedicated signaling and to signal TMGIs of newly starting MBMS services by a system information block (SIB). In addition, in accordance with the exemplary embodiments of the invention, these novel techniques are performed without overloading existing SIBs or excessive concurrent dedicated signaling to a large amount of terminals.

It should be noted that normally a SIB, such as a newly defined SIB13bis, could signal the frequency identifier of the cell where MBMS service is available and/or signal a notification that the terminals are to monitor for an M-RNTI message. Then TMGI(s) of newly starting MBMS services could momentarily be added to the contents of the SIB.

According to 3GPP TS 36.331 V10.0.0, the IE SystemInformationBlockType13 contains the information required to acquire the MBMS control information associated with one or more MBSFN areas.

To keep the terminals in an RRC_Connected state informed, the exemplary embodiments of the invention provide operations including separating the signalling mechanisms for providing information, such as regarding the TMGIs, based on whether the MBMS services are 1) on-going or 2) newly starting. The reason is that case 1) is characterized by a potentially large number of TMGIs, but typically requiring provisioning to different terminals at different points in time, whereas case 2) typically involves only one TMGI at a time, but also requires signalling to a potentially large number of terminals (i.e. to all the terminals in RRC_Connected states in the cell that have indicated an interest in keeping aware of what MBMS services are available).

Figure 1:
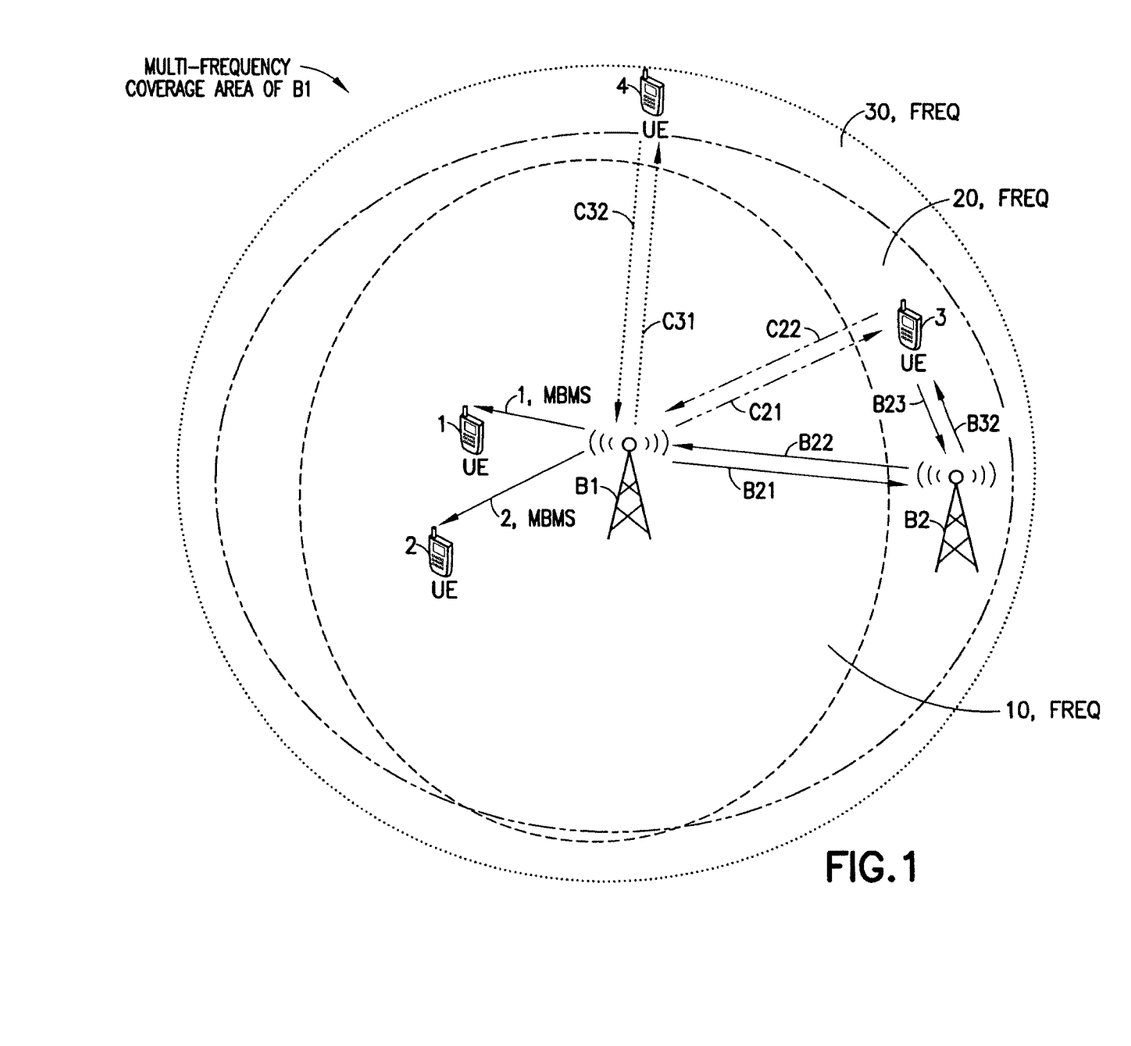
FIG. 1 is a diagram showing radio environment including a multi-frequency coverage area wherein the exemplary embodiments of the invention as disclosed herein can be practiced to advantage.

FIG. 1 illustrates another scenario in which the above described problems could exist, and in which the exemplary embodiments of the invention would be advantageous for at least the reasons described below. In FIG. 1, there is a base station B1 provisioning multiple carrier frequencies FREQ10, FREQ20, and FREQ30. In FREQ10, UE1 and UE2 are receiving MBMS services/sessions MBMS1 and MBMS2. The user equipment UE1, UE2, UE3, and UE4 are all within the coverage area of the multi-frequency coverage area of base station B1. In this non-limiting scenario, as illustrated in FIG. 1, MBMS services/sessions may only be provided in FREQ10. However, the exemplary embodiments of the invention may be practiced where more than one carrier frequency provides such MBMS services/sessions in such a multi-frequency coverage area. In FIG. 1, the communication C21 between the base station B1 and UE3 in the FREQ20 can include information such as indication(s) relating to only a change of a set of MBMS services of the FREQ 10. This change can be an MBMS service which is on-going, newly starting, changing, and/or disappearing in the FREQ10. Further, in accordance with the exemplary embodiments the communication C22 can be a response to this information and/or an indication from the UE3 that information regarding a change of MBMS service is desired by the UE3.

Further, with regards to FIG. 1, in FREQ30 communications C31 and C32 can be performed between the base station B1 and the UE4 in FREQ30. These C31 and C32 communications can be similar to C21 and C22, respectively, as described above. In addition, in another non-limiting exemplary embodiment of the invention, as illustrated in FIG. 1, the base station B1 signals (B21) the base station B2 that an MBMS session, such as the MBMS 1 and/or the MBMS2 or another MBMS service/session has changed in some manner. These changes can be at least that an MBMS service/session is on-going, newly starting, changing, and/or disappearing, as described above. The base station B2 can then signal (B23) the UE3 indicating the received change indication to the UE3. In accordance with an exemplary embodiment of the invention, the UE3 can signal (C22) the base station B1 indicating it be informed of the change, and the base station B1 may signal (C21) the UE3 of the change and/or indicate to the UE3 where to get the related MBMS information. Further, in a non-limiting exemplary embodiment of the invention, the UE3 may signal (B32) the base station B2 indicating that it should be informed of the change. The base station B2 can signal (B22) the base station B1 relaying the UE3s desire to be informed. The base station B1 can signal (C21) the UE3 directly, as described above, or the base station B1 can signal (B21) the base station B2 with the requested MBMS change information and/or information regarding where the UE3 can get the desired MBMS information. Then the base station B2 can relay this or similar information to UE3.

In addition, the exemplary embodiments of the invention provide for communications which advantageously be used to make inter-frequency handover decisions between the different carrier frequencies in a multi-frequency coverage area, such as the area illustrated in FIG. 1.

In accordance with one exemplary embodiment of the invention, the system uses an M-RNTI message with a similar or the same meaning (hence the same bit set) as is used for MCCH change notification in the MBMS cell. As such, the message would indicate to a terminal which of the MCCH(s) in the MBMS cell would contain the information about newly starting services. The use of this embodiment requires an MBMS cell not only to inform other cells about new TMGIs related to MBMS service content, but also the content of the M-RNTI message to be transmitted. It is noted that the MBMS cell may be seen to be referring to a carrier frequency of a communication coverage area and/or cell.

In accordance with another exemplary embodiment of the invention, an indication of TMGIs for on-going MBMS services is sent via dedicated signalling to each terminal, instead of as part of the system-information broadcast. Such an indication would typically be sent to a terminal as a response to the terminal having indicated an interest in keeping aware of what MBMS services are available (which it would do after discovering from a SIB that MBMS services are available on another frequency carrier). Depending on the network policy, another possible response could also be simply to hand the terminal over to the carrier providing MBMS, without knowing whether any of the on-going services are actually of interest to the terminal.

In accordance with another exemplary embodiment of the invention, in order to inform terminals about newly starting MBMS service(s)/session(s) on another frequency carrier, the TMGI of that MBMS service is momentarily (exact duration up to network implementation) broadcast in a SIB, such as SIB13bis. This represents a compromise between the above mentioned straightforward baseline option of announcing the TMGIs of all on-going services in System Information, and providing the TMGI of the newly starting service by dedicated signalling to all terminals in RRC_Connected having previously indicated an interest in MBMS services.

Being an addition to System Information, it would be highly desirable that indications of the appearance and disappearance of TMGI(s), broadcast for such purely MBMS purposes, would not trigger the regular system-information change procedure and hence re-acquisition of System Information by all terminals. Therefore, in accordance with further exemplary embodiments of the invention, the M-RNTI message is reused to notify terminals when new TMGI(s) appear in the SIB. The possibility to reuse the M-RNTI message in this way, instead of its current purpose of notifying terminals about changes in one or more MCCHs transmitted by the cell, stems from the fact that there are no MCCHs transmitted by this cell (because they are transmitted on one frequency only). No notification is needed when the cell decides to remove the TMGI from the SIB.

Figure 2A:
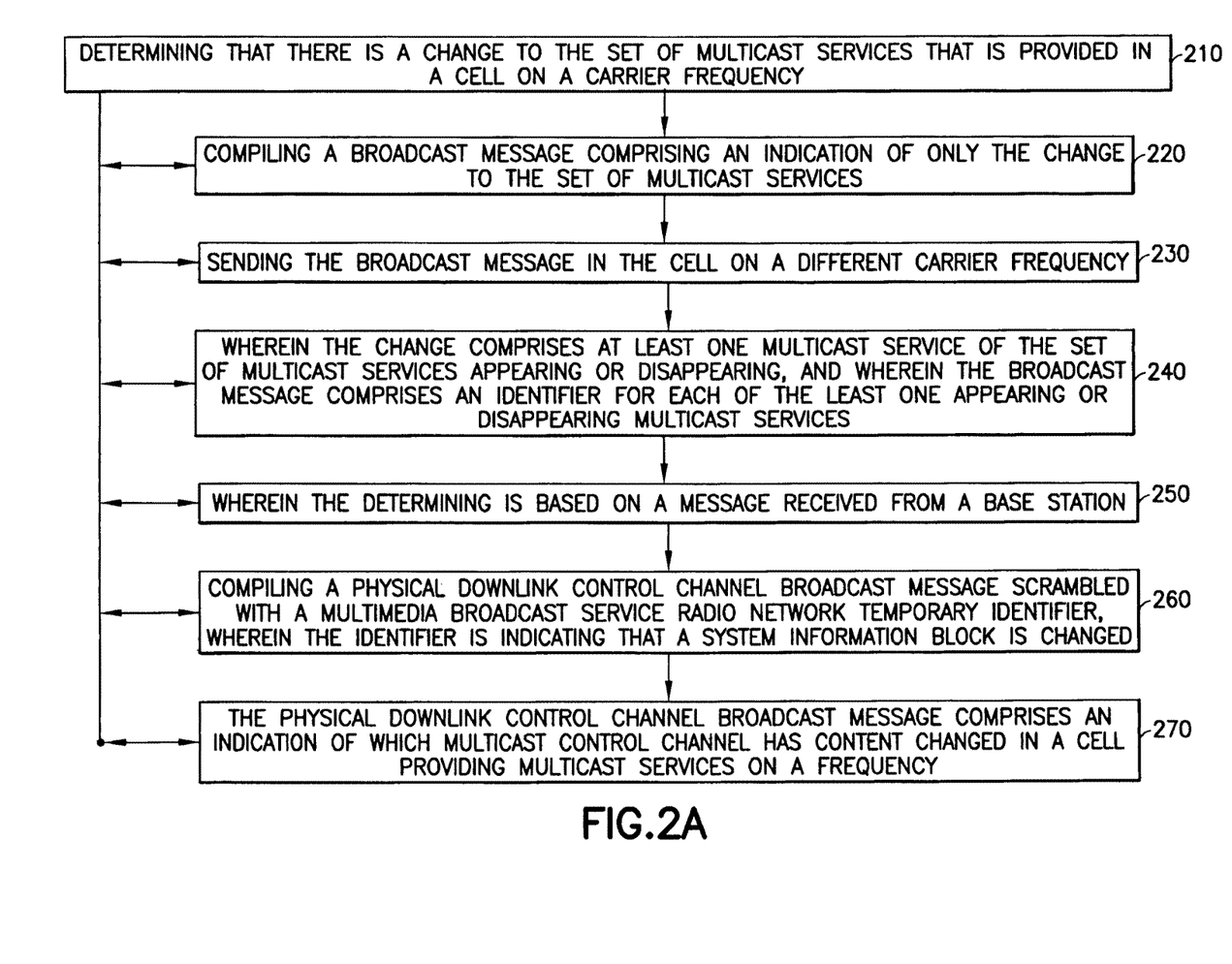
FIGS. 2A, 2B, and 2C are logic flow diagrams illustrating the operation of a method, and a result of execution of computer program instructions embodied on a computer readable memory, for practicing exemplary embodiments of this invention from the perspective of various devices as at least shown in FIGS. 1 and 3.
Figure 2B:
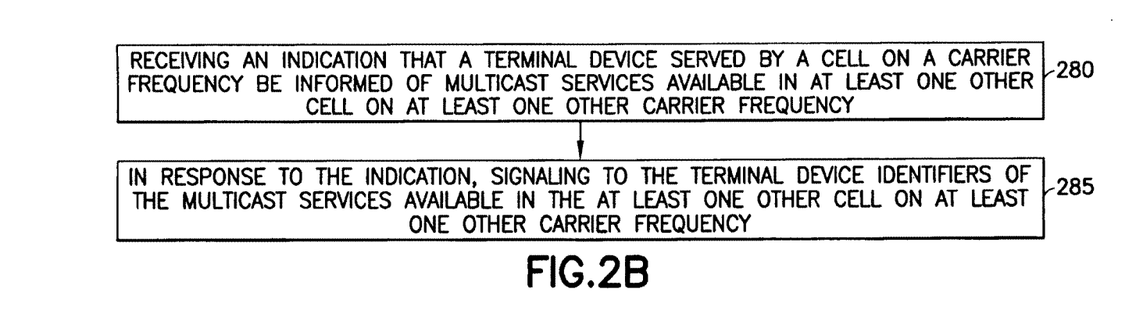
Figure 2C:
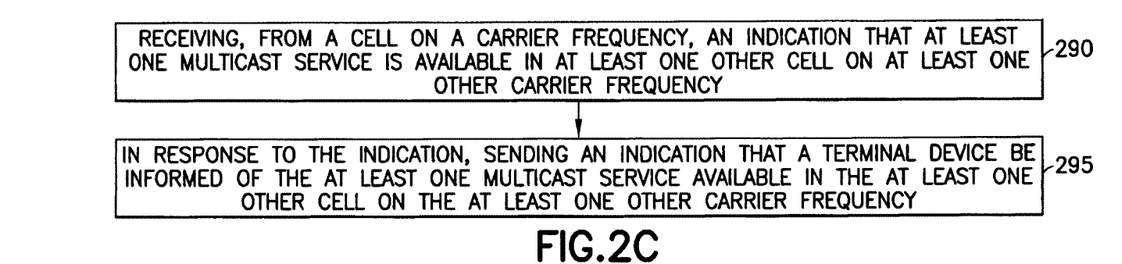

FIGS. 2A, 2B and 2C are block diagrams which each describe an exemplary embodiment of the invention. The operations of FIG. 2A can be seen to be from a perspective of the network access node/eNB, or the perspective of another higher node such as may be in the core network as detailed for various embodiments of the invention. According to these exemplary embodiments as disclosed herein, at block 210 the eNB (or one or more components thereof) determines that there is a change to the set of multi-cast services that is provided in a cell on a carrier frequency. Then at block 220 there is compiling a broadcast message comprising an indication of only the change to the set of multi-cast services. Further, at block 230 there is sending the broadcast message in the cell on a different carrier frequency.

Further details at FIG. 2A summarize various of the non-limiting embodiments as detailed at least in the description. Specifically, in FIG. 2A at block 240 wherein the change comprises at least one multicast service of the set of multicast services appearing or disappearing, and wherein the broadcast message comprises an identifier for each of the at least one appearing or disappearing multicast services. Another embodiment is shown at block 250 wherein the determining is based on a message received from a base station. Further, as shown in block 260 the method comprising compiling a physical downlink control channel broadcast message scrambled with a multimedia broadcast service radio network temporary identifier, wherein the identifier is indicating that a system information block is changed, such as in a frequency cell providing multicast services. Indicated, at block 270, the physical downlink control channel broadcast message comprises an indication of which multicast control channel has content changed in a cell providing multicast services on a frequency.

The embodiments of block 210, 220 and 230 can be combined with any of blocks 240, 250, 260 and 270.

The operations of FIG. 2B can be also be seen to be from a perspective of the network access node/eNB, or the perspective of another higher node such as may be in the core network as detailed for various embodiments of the invention. According to these exemplary embodiments as disclosed herein, at block 280 a device, such as an eNB, is receiving an indication that a terminal device served by a cell on a carrier frequency be informed of multicast services available in at least one other cell on at least one other carrier frequency. Further, at block 285 there is, in response to the indication, signaling to the terminal device identifiers of the multicast services available in the at least one other cell on at least one other carrier frequency.

Further, in regards to FIG. 2C, there is at block 290 receiving, from a frequency cell, an indication that at least one multicast service is available in at least one other cell on at least one other carrier frequency. At block 295, in response to the indication, there is sending an indication that a terminal device be informed of the at least one multicast service available in the at least one other cell on the at least one other carrier frequency.

Figure 3:
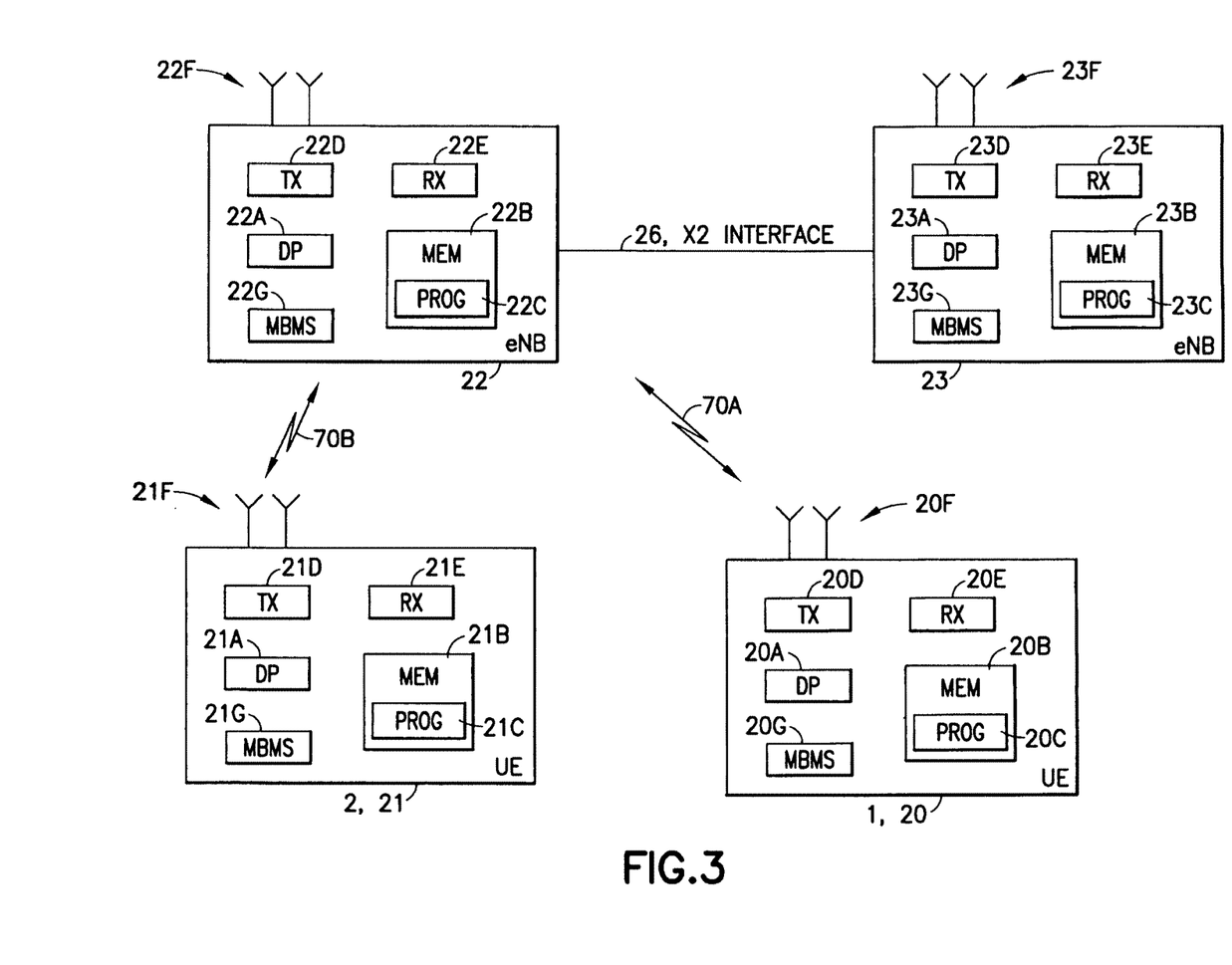
FIG. 3 is a simplified block diagram of the exemplary electronic devices suitable for use in practicing the exemplary embodiments of the invention.

Reference is now made to FIG. 3 for illustrating a simplified block diagram of various electronic devices and apparatus that are suitable for use in practicing the exemplary embodiments of this invention. In FIG. 3 there is a first network access node/eNB 22 coupled via an X2 interface to a second network access node/eNB 23, of which the former is shown as adapted for communication over wireless links 70A, 70B with two apparatus 20, 21, such as mobile terminals or termed more generally as user equipments UEs. The access nodes 22, 23 may be further communicatively coupled to further networks (e.g., a publicly switched telephone network PSTN and/or a data communications network/Internet), possibly via a higher network node such as a serving gateway in the case of the LTE system.

The first UE 20 includes processing means such as at least one data processor (DP) 20A, storing means such as at least one computer-readable memory (MEM) 20B storing at least one computer program (PROG) 20C, communicating means such as a transmitter TX 20D and a receiver RX 20E for bidirectional wireless communications with the node B 22 via one or more antennas 20F. Within the memory 20B of the first UE 20 is also the MBMS unit 20G of the UE 20 operates to process the dedicated signaling and/or the broadcast message regarding the multi-cast or multimedia broadcast service. The second UE 21 is similarly functional with blocks 21A, 21B, 21C, 21D, 21F and 21G.

The first access node or eNB 22 also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with its associated user devices 20, 21 via one or more antennas 22F and a modem 22H. The first access node 22 also has stored in its memory the MBMS unit 22G of the UE 21 operates to process the dedicated signaling and/or the broadcast message regarding the multi-cast or multimedia broadcast service. In one embodiment this MBMS unit 22G is configured to perform the exemplary embodiments of the invention as disclosed in the description, and at least described in FIG. 2.

The second access node or eNB 23 is similarly functional with blocks 23A, 23B, 23C, 23D, 23F and 23H. The second access node 23 may or may not be identical to that of the first access node in all embodiments of these teachings. The second access node may be associated with a multi-cast or multimedia broadcast service.

One or more of the PROGs 20C, 21C, 22C in the UEs 20, 21 and in the first access node 22 s assumed to include program instructions that, when executed by the associated DP 20A, 21A, 22A, enable the device to operate in accordance with the exemplary embodiments of this invention as detailed more fully above. In this regard the exemplary embodiments of this invention may be implemented at least in part by computer software stored on the MEM 20B, 21B, 22B which is executable by the DP 20A, 21A, 22A of the respective devices 20, 21, 22; or by hardware; or by a combination of tangibly stored software and hardware (and tangibly stored firmware). Electronic devices implementing these aspects of the invention need not be the entire UE 20, 21 or access node 22, but exemplary embodiments may be implemented by one or more components of same such as the above described tangibly stored software, hardware, firmware and DP, or a system on a chip SOC or an application specific integrated circuit ASIC or a digital signal processor DSP or a modem or a subscriber identity module commonly referred to as a SIM card.

Various embodiments of the UE 20, 21 can include, but are not limited to: cellular telephones; data cards, USB dongles, personal portable digital devices having wireless communication capabilities including but not limited to laptop/palmtop/tablet computers, digital cameras and music devices, and Internet appliances. Other embodiments of the described UE 20, 21 may be implemented as a M2M device which may not have a user interface directly but instead be remotely disposed for user-free operation.

Various embodiments of the computer readable MEM 20B, 21B, 22B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 20A, 21A, 22A include but are not limited to general purpose computers, special purpose computers, microprocessors, digital signal processors (DSPs) and multi-core processors.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
    receiving by a user equipment in a radio resource control connected state with a cell, from a base station of the cell on a carrier frequency, a message comprising an indication that at least one multi-cast service is available in at least one other cell on at least one other carrier frequency;
    in response to the indication, sending, by the user equipment, an indication toward the base station that said user equipment be informed of said at least one multi-cast service available in said at least one other cell on said at least one other carrier frequency; and
    in response to the indication that the user equipment be informed, receiving, by the user equipment, identifiers of said at least one multi-cast service available in said at least one other cell on said at least one other carrier frequency.

2. The method of claim 1, comprising: in response to the indication that the user equipment be informed, receiving, by the user equipment, a message on said at least one other carrier frequency comprising the identifiers of said at least one multicast multi-cast service available in said at least one other cell on said at least one other carrier frequency.

3. The method according to claim 1, wherein said identifiers are received by the user equipment over dedicated signaling, and wherein the identifiers received over the dedicated signaling only identify ongoing multi-cast services in said at least one other cell on said at least one other carrier frequency.

4. The method according to claim 1, wherein said identifiers are received by the user equipment over broadcast signaling, and wherein the identifiers received over the broadcast signaling only identify newly started multi-cast services in said at least one other cell on said at least one other carrier frequency.

5. The method according to claim 1, performed by at least one computer program embodied on at least one non-transitory memory and executed by at least one processor.

6. An apparatus comprising:
   at least one processor; and
   at least one memory including computer program code, wherein the at least one processor executes the computer program code to perform at least:
   receiving by a user equipment in a radio resource control connected state with a cell, from a base station of the cell on a carrier frequency, a message comprising an indication that at least one multi-cast service is available in at least one other cell on at least one other carrier frequency;
   sending, in response to the indication, an indication that said user equipment be informed of said at least one multi-cast service available in said at least one other cell on said at least one other carrier frequency; and
   in response to the indication that the user equipment be informed, receiving, by the user equipment, a message comprising identifiers of said at least one multi-cast service available in said at least one other cell on said at least one other carrier frequency.

7. The apparatus of claim 6, wherein said identifiers are received over dedicated signaling, and wherein the received identifiers over the dedicated signaling only identify ongoing multi-cast services in said at least one other cell on said at least one other carrier frequency.

8. The apparatus of claim 6, wherein said identifiers are received over broadcast signaling, and wherein the identifiers received over the broadcast signaling only identify newly started multi-cast services in said at least one other cell on said at least one other carrier frequency.

9. A method comprising:
   sending, by a base station, a message to a user equipment in a radio resource control connected state with the base station, from a cell on a carrier frequency, an indication that at least one multi-cast service is available in at least one other cell on at least one other carrier frequency; and
   in response to the indication, receiving, by the base station, an indication from said user equipment that said user equipment be informed of said at least one multi-cast service available in said at least one other cell on said at least one other carrier frequency; and
   in response to the indication that the user equipment be informed, sending, by the base station, identifiers of said at least one multi-cast service available in said at least one other cell on said at least one other carrier frequency.

10. The method of claim 9, wherein said identifiers are sent over dedicated signaling, and wherein the identifiers sent over the dedicated signaling only identify ongoing multi-cast services in said at least one other cell on said at least one other carrier frequency.

11. The method of claim 9, wherein said identifiers are sent over broadcast signaling, and wherein the identifiers sent over the broadcast signaling only identify newly started multi-cast services in said at least one other cell on said at least one other carrier frequency.

12. The method according to claim 9, performed by at least one computer program embodied on at least one non-transitory memory and executed by at least one processor.

13. An apparatus comprising:
   at least one processor; and
   at least one memory including computer program code, wherein the at least one processor executes the computer program code to perform at least:
   sending to a user equipment in a radio resource control connected state with a cell, from a base station of the cell on a carrier frequency, a message comprising an indication that at least one multi-cast service is available in at least one other cell on at least one other carrier frequency; and
   receiving, in response to the indication, an indication from said user equipment that said user equipment be informed of said at least one multi-cast service available in said at least one other cell on said at least one other carrier frequency; and
   in response to the indication that the user equipment be informed, sending identifiers of said at least one multi-cast service available in said at least one other cell on said at least one other carrier frequency.

14. The apparatus of claim 13, wherein said identifiers are sent over dedicated signaling, and wherein the identifiers sent over the dedicated signaling only identify ongoing multi-cast services in said at least one other cell on said at least one other carrier frequency.

15. The apparatus of claim 13, wherein said identifiers are sent over broadcast signaling, and wherein the identifiers sent over the broadcast signaling only identify newly started multi-cast services in said at least one other cell on said at least one other carrier frequency.

* * * * *